US010775659B2

(12) United States Patent
Shang et al.

(10) Patent No.: US 10,775,659 B2
(45) Date of Patent: Sep. 15, 2020

(54) ARRAY SUBSTRATE, DISPLAY DEVICE AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jianxing Shang, Beijing (CN); Dongkun Wu, Beijing (CN); Min Mao, Beijing (CN); Yanqiang Wang, Beijing (CN); Kun Liu, Beijing (CN); Xiaodong Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 119 days.

(21) Appl. No.: 16/073,077

(22) PCT Filed: Dec. 20, 2017

(86) PCT No.: PCT/CN2017/117476
§ 371 (c)(1),
(2) Date: Jul. 26, 2018

(87) PCT Pub. No.: WO2018/214491
PCT Pub. Date: Nov. 29, 2018

(65) Prior Publication Data
US 2019/0331951 A1     Oct. 31, 2019

(30) Foreign Application Priority Data
May 25, 2017 (CN) .......................... 2017 1 0378364

(51) Int. Cl.
*G02F 1/1333* (2006.01)
*G02F 1/133* (2006.01)
(Continued)

(52) U.S. Cl.
CPC ........ *G02F 1/13338* (2013.01); *G02F 1/1368* (2013.01); *G02F 1/13306* (2013.01);
(Continued)

(58) Field of Classification Search
CPC .............. G02F 1/13338; G02F 1/1368; G02F 1/136286; G02F 1/13306; G02F 1/1333;
(Continued)

(56) References Cited

U.S. PATENT DOCUMENTS

2011/0043466 A1   2/2011   Kim et al.
2016/0328071 A1   11/2016   Yan
(Continued)

FOREIGN PATENT DOCUMENTS

CN    104820321 A    8/2015
CN    104882092 A    9/2015
(Continued)

OTHER PUBLICATIONS

International Search Report and Written Opinion dated Mar. 19, 2018.

*Primary Examiner* — Abhishek Sarma
(74) *Attorney, Agent, or Firm* — Dilworth & Barrese, LLP.; Michael J. Musella, Esq.

(57) ABSTRACT

An array substrate, a display device and a driving method thereof are provided. The array substrate includes a base substrate, which includes a display region and a peripheral region surrounding the display region; and a first thin film transistor, a second thin film transistor, a data line, a first electrode and a second electrode, which are disposed on the base substrate and located in the display region. The first thin
(Continued)

film transistor includes a first source electrode and a first drain electrode; the second thin film transistor includes a second source electrode and a second drain electrode; the first source electrode and the second source electrode are respectively connected with the data line, the first drain electrode is connected with the first electrode, the second drain electrode is connected with the second electrode.

18 Claims, 5 Drawing Sheets

(51) Int. Cl.
  *G02F 1/1362*    (2006.01)
  *G02F 1/1368*    (2006.01)
  *G06F 3/041*     (2006.01)
  *G06F 3/044*     (2006.01)

(52) U.S. Cl.
  CPC ........ *G02F 1/136286* (2013.01); *G06F 3/044* (2013.01); *G06F 3/0412* (2013.01)

(58) Field of Classification Search
  CPC ........ G02F 1/133; G06F 3/044; G06F 3/0412; G06F 3/0416; G09G 3/36
  See application file for complete search history.

(56) References Cited

U.S. PATENT DOCUMENTS

| | | |
|---|---|---|
| 2017/0168618 A1 | 6/2017 | Ding et al. |
| 2017/0235405 A1 | 8/2017 | Wang et al. |
| 2018/0239466 A1* | 8/2018 | Yan ........................ G06F 3/044 |

FOREIGN PATENT DOCUMENTS

| | | |
|---|---|---|
| CN | 104991678 A | 10/2015 |
| CN | 105094431 A | 11/2015 |

\* cited by examiner

ARRAY SUBSTRATE, DISPLAY DEVICE AND DRIVING METHOD THEREOF

CROSS REFERENCE

The present application claims priority of China Patent application No. 201710378364.7 filed on May 25, 2017, the content of which is incorporated in its entirety as portion of the present application by reference herein.

TECHNICAL FIELD

Embodiments of the present disclosure relate to an array substrate, a display device and a driving method thereof.

BACKGROUND

With continuous development of smart display devices, touch technology has become an indispensable function of smart display devices. Therefore, a touch screen that can be used for both display and touch operation is increasingly used in smart display devices such as mobile phones, tablets, and notebook computers.

Generally, touch technology includes difference technical directions such as optical, resistive, capacitive, and electromagnetic touch technologies; in many touch technologies, capacitive touch technology has become the mainstream of touch technology due to its low cost and excellent user experience. Capacitive touch technology can be divided into two types of self-capacitance and mutual capacitance.

SUMMARY

Embodiments of the present disclosure provides an array substrate, a display device and a driving method thereof. The array substrate includes a base substrate and a first thin film transistor, a second thin film transistor, a data line, a first electrode and a second electrode which are disposed on the base substrate. The first thin film transistor includes a first source electrode and a first drain electrode; the second thin film transistor includes a second source electrode and a second drain electrode, the first source electrode and the second source electrode are respectively connected with the data line, the first drain electrode is connected with the first electrode, the second drain electrode is connected with the second electrode, the first electrode is a pixel electrode, and the second electrode is a touch electrode. The array substrate can simultaneously implement a display function and a touch function.

At least one embodiment of the present disclosure provides an array substrate, which includes: a base substrate; and a first thin film transistor, a second thin film transistor, a data line, a first electrode and a second electrode which are disposed on the base substrate, wherein the first thin film transistor includes a first source electrode and a first drain electrode, the second thin film transistor includes a second source electrode and a second drain electrode, the first source electrode and the second source electrode are respectively connected with the data line, the first drain electrode is connected with the first electrode, the second drain electrode is connected with the second electrode, the first electrode is a pixel electrode, and the second electrode is a touch electrode.

For example, in an array substrate provided by an embodiment of the present disclosure, the second electrode is also used as a common electrode.

For example, in an array substrate provided by an embodiment of the present disclosure, a ratio of a number of the first thin film transistors to a number of the second thin film transistors is greater than or equal to 1:1.

For example, in an array substrate provided by an embodiment of the present disclosure, the array substrate further includes: a third thin film transistor and a fourth thin film transistor which are disposed on the base substrate and located in a peripheral region, wherein the third thin film transistor includes a third source electrode and a third drain electrode, the fourth thin film transistor includes a fourth source electrode and a fourth drain electrode, the third source electrode is configured to be connected with a display driving circuit, the fourth source electrode is configured to be connected with a touch driving circuit, the third drain electrode and the fourth drain are respectively connected with the data line.

For example, in an array substrate provided by an embodiment of the present disclosure, the data line is configured to load a display data signal, a touch signal, and a common voltage signal.

For example, the array substrate provided by an embodiment of the present disclosure further includes a storage electrode, disposed in a same layer as the second electrode, and an orthogonal projection of the storage electrode on the base substrate at least partially being overlapped with an orthogonal projection of the first electrode on the base substrate.

For example, in an array substrate provided by an embodiment of the present disclosure, the first thin film transistor is disposed in a same layer as the second thin film transistor.

For example, in an array substrate provided by an embodiment of the present disclosure, the first source electrode, the second source electrode and the data line are formed by one patterning process.

For example, the array substrate provided by an embodiment of the present disclosure further includes: a passivation layer, disposed on a side of the first thin film transistor and the second thin film transistor away from the base substrate; and an insulating layer, disposed between the first electrode and the second electrode, wherein the first electrode is disposed on a side of the passivation layer away from the base substrate, and the second electrode is disposed on a side of the insulating layer away from the base substrate.

For example, in an array substrate provided by an embodiment of the present disclosure, the first electrode is connected with the first drain electrode through a first via hole in the passivation layer, the second electrode is connected with the second drain electrode through a second via hole in the passivation layer and a third via hole in the insulating layer.

For example, the array substrate provided by an embodiment of the present disclosure further includes: a first gate line; and a second gate line, wherein the first thin film transistor further includes a first gate electrode, the second thin film transistor further includes a second gate electrode, the first gate electrode is connected with the first gate line, the second gate electrode is connected with the second gate line.

For example, in an array substrate provided by an embodiment of the present disclosure, the first gate line is parallel to the second gate line.

For example, in an array substrate provided by an embodiment of the present disclosure, the first thin film transistor further includes a first active layer, the first active layer is disposed between a layer of the first gate electrode and a layer of the first source electrode and the first drain electrode, the second thin film transistor further includes a second source layer, the second source layer is disposed between a layer of the second gate electrode and a layer of the second source electrode and the second drain electrode.

At least one embodiment of the present disclosure provides a display device, which includes the array substrate according to any one of abovementioned embodiments.

For example, a display device provided by an embodiment of the present disclosure further includes: a first driver, configured to provide a display data signal, a touch signal and a common voltage signal for the data line in a time sequence; and a second driver, configured to turn on or off the first thin film transistor and the second thin film transistor in a time sequence.

At least one embodiment of the present disclosure provides a driving method of a display device, the display device incudes the array substrate according to any one of abovementioned embodiments, the driving method includes: in a first time period, applying a display data signal to the data line, turning on the first thin film transistor, and turning off the second thin film transistor, wherein the data line transmits the display data signal to the first electrode through the first thin film transistor; in a second time period, applying a touch signal to the data line, turning off the first thin film transistor, and turning on the second thin film transistor, wherein the data line transmits the touch signal to the second electrode through the second thin film transistor; and in a third period, applying a common voltage signal to the data line, turning off the first thin film transistor, and turning on the second thin film transistor, wherein the data line transmits the common voltage signal to the second electrode through the second thin film transistor.

BRIEF DESCRIPTION OF THE DRAWINGS

In order to clearly illustrate the technical solution of embodiments of the present disclosure, the drawings of the embodiments or related technical description will be briefly described in the following; it is obvious that the drawings in the description are only related to some embodiments of the present disclosure and not limited to the present disclosure.

DETAILED DESCRIPTION

In order to make objects, technical details and advantages of the embodiments of the present disclosure apparently, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "include," "including," etc., are intended to specify that the elements or the objects stated before these terms encompass the elements or the objects and equivalents thereof listed after these terms, but do not preclude the other elements or objects. The phrases "connect," "connected," etc., are not intended to define a physical connection or mechanical connection, but may include an electrical connection, directly or indirectly.

Currently, the touch screen can include an on-cell touch screen and an in-cell touch screen or the like. In an on-cell touch screen, for example, a touch panel is disposed between a color film substrate and a polarizing plate of a liquid crystal panel, therefore, the on-cell touch screen is relatively thick and heavy, and it is difficult to meet the demand for thinness and lightness of a smart display device. However, in an in-cell touch screen, a touch sensor is disposed inside the liquid crystal panel, and only one layer of protective glass is attached to the outer side of the screen, so that the in-cell touch screen has advantages of high transparency, high adhesion rate, and thinness and lightness.

Figure 1:
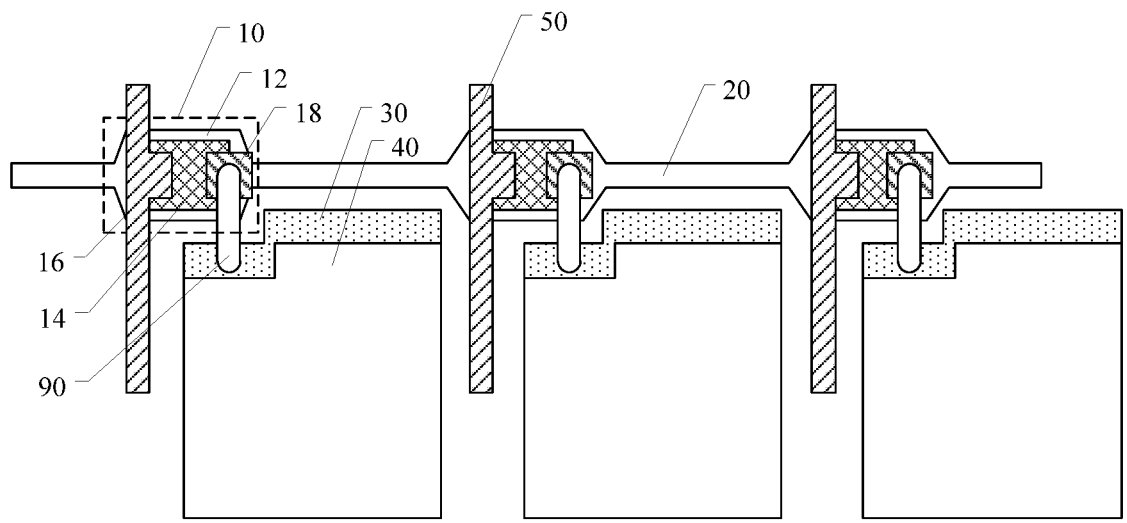
FIG. 1 is a planar view of an array substrate.

FIG. 1 illustrates an array substrate. As illustrated in FIG. 1, the array substrate includes a thin film transistor 10, a gate line 20, a data line 50, a pixel electrode 30 and a common electrode 40, which are disposed on a base substrate. The thin film transistor 10 includes a gate electrode 12, an active layer 14, a source electrode 16 and a drain electrode 18. The gate electrode 12 is electrically connected with the gate line 20, for example, the gate electrode 12 and the gate line 20 can be patterned by the same conductive layer; the source electrode 16 is electrically connected with the data line 50, for example, the source electrode 16 and the data line 50 can be patterned by the same conductive layer. Therefore, the array substrate can load a display signal to the pixel electrode through the data line in a row-by-row manner through the scanning of the gate line, thereby realizing the display function.

In some examples, the common electrode 40 is a slit electrode, the pixel electrode 30 is a plate electrode or a slit electrode, the common electrode 40 is located on an opposite side of the pixel electrode 30 from the substrate, that is, a side of the pixel electrode 30 away from the base substrate.

Figure 2:
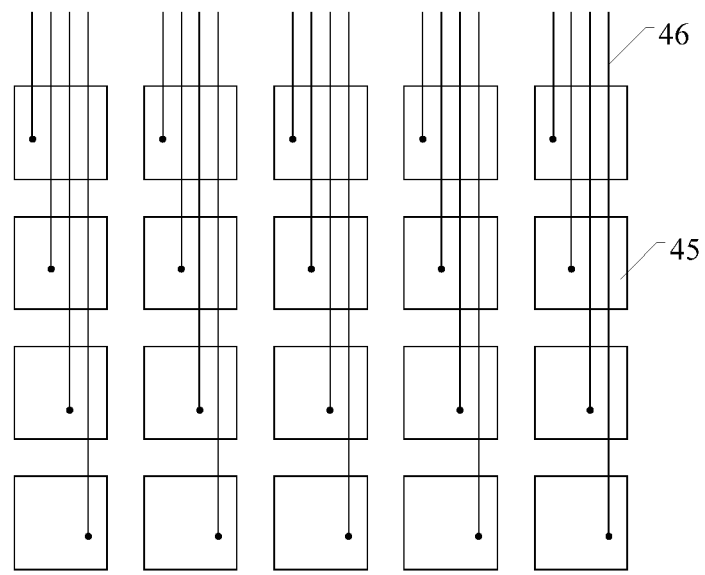
FIG. 2 is a planar view of a touch electrode structure.

FIG. 2 illustrates a touch electrode structure. As illustrated in FIG. 2, the touch electrode structure includes a plurality of touch electrodes 45 arranged in an array, the plurality of touch electrodes 45 being respectively connected with a plurality of signal transmission lines 46. A principle of the touch electrode structure includes that: the plurality of touch electrodes 45 are disposed in the same layer and insulated from each other; each of the touch electrodes 45 can be connected to a touch detection chip through a signal transmission line 46. Upon a human body not touching the screen, the capacitance of each capacitor electrode is a fixed value; upon a touch occurring, the capacitance of the touch electrodes 45 corresponding to the touch position is a fixed value superimposed on the human body capacitance, the touch detection chip can determine the touch position by detecting the change of the capacitance value of each of the touch electrodes 45.

Embodiments of the present disclosure provide an array substrate, a display device and a driving method thereof. The array substrate includes a base substrate and a first thin film transistor, a second thin film transistor, a data line, a first electrode and a second electrode which are disposed on the base substrate. The first thin film transistor includes a first source electrode and a first drain electrode; the second thin film transistor includes a second source electrode and a second drain electrode, the first source electrode and the second source electrode are respectively connected with the data line, the first drain electrode is connected with the first electrode, the second drain electrode is connected with the second electrode, the first electrode is a pixel electrode, and the second electrode is a touch electrode. The array substrate can load a signal on the data line to the first electrode and the second electrode in a time division manner through the first thin film transistor and the second thin film transistor, so as to simultaneously implement display function and touch function. And, the array substrate does not need to additionally provide a touch metal layer and a touch signal line, thereby reducing the number of mask processes of the array substrate, and the costs of the array substrate.

Figure 3A:
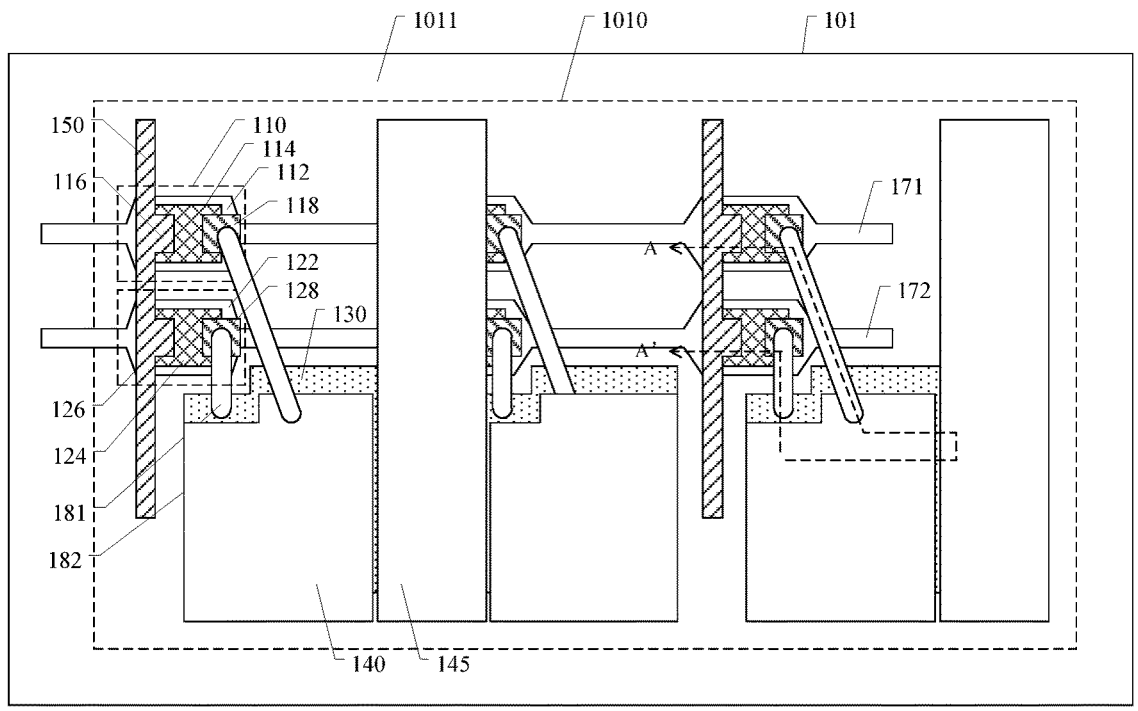
FIG. 3A is a planar view of an array substrate provided by an embodiment of the present disclosure.

An embodiment of the present disclosure provides an array substrate. FIG. 3A illustrates an array substrate according to the present embodiment. As illustrated in FIG. 3A, the array substrate includes a base substrate 101, the base substrate 101 includes a display region 1010 and a peripheral region 1011 surrounding the display region 1010; and a first thin film transistor 110, a second thin film transistor 120, a data line 150, a first electrode 130 and a second electrode 140 which are disposed on the base substrate 101 and located in the display region 1010. The first thin film transistor 110 includes a first source electrode 116 and a first drain electrode 118; the second thin film transistor 120 includes a second source electrode 126 and a second drain electrode 128; the first source electrode 116 and the second source electrode 126 are respectively connected with the data line 150, the first drain electrode 118 is connected with the first electrode 130, the second drain electrode 128 is connected with the second electrode 140. For example, as illustrated in FIG. 3A, the first source electrode 116 of the first thin film transistor 110 and the second source electrode 126 in the second thin film transistor 120 which are adjacently disposed in an extension direction of the data line 150 are connected to the same data line 150, the first source electrode 116 and the second source electrode 126 are respectively connected with the data line 150, the first drain electrode 118 is connected with the first electrode 130, the second drain electrode 128 is connected with the second electrode 140, the first electrode 130 is a pixel electrode, the second electrode 140 is a touch electrode.

In the array substrate provided by the present embodiment, the array substrate can load a signal on the data line to the first electrode and the second electrode in a time division manner through the first thin film transistor and the second thin film transistor, so as to simultaneously implement a display function and a touch function. For example, upon the first thin film transistor being turned on and the second thin film transistor being turned off, a signal in the data line can be loaded to the first electrode, in this case, the display function can be realized by loading a display data signal to the data line; upon the first thin film transistor being turned off and the second thin film transistor being turned on, the signal in the data line can be loaded to the second electrode, in this case, the data line can load a touch signal and a common voltage signal in a time division manner, thereby simultaneously realizing the touch function and the display function. Furthermore, the array substrate does not need to be additionally provided with a touch metal layer and a touch signal line, thereby reducing the number of mask processes of the array substrate, and the costs of the array substrate.

For example, in the array substrate provided by an example of the present embodiment, the second electrode is also used as a common electrode. That is, in embodiments of the present disclosure, the second electrode can serve as a common electrode for forming an electric field with the pixel electrode upon being used for display, or a touch electrode for performing the touch control.

For example, in the array substrate provided by an example of the present embodiment, as illustrated in FIG. 3A, the array substrate further includes a storage electrode 145 disposed in the same layer as the second electrode 140, an orthogonal projection of the storage electrode 145 on the base substrate 101 are at least partially overlapped with an orthogonal projection of the first electrode 130 on the base substrate 101. Thus, the storage electrode 145 and the first electrode 130 can constitute a storage capacitor to store the display data signal in the first electrode.

For example, as illustrated in FIG. 3A, the storage electrode 145 is parallel to the data line 150 and disposed between adjacent sub-pixels. For example, each storage electrode can be connected with the common voltage signal. Certainly, embodiments of the present disclosure include but are not limited thereto, each storage electrode can also be parallel to the gate line, as long as the storage electrode and the first electrode can form a storage capacitor.

For example, in the array substrate provided by an example of the present disclosure, the data line can load the display data signal, the touch signal and the common voltage signal.

For example, in the array substrate provided by an example of the present disclosure, the data line can sequentially load the display data signal, the touch signal, and the common voltage signal. Thus, upon the array substrate provided by the present embodiment performing display and touch, in a first time period, the data line is loaded with the display data signal, in this case, a thin film transistor (the first thin film transistor or the second thin film transistor) connected with the pixel electrode can be turned on, the pixel electrode is charged; in a second time period, the data line is loaded with the touch signal, in this case, a thin film transistor (the first thin film transistor or the second thin film transistor) connected with the common electrode can be turned on, the common electrode can be used as the touch electrode; in a third period, the data line is loaded with the common voltage signal, the common electrode is charged, thereby forming an electric field with the pixel electrode to drive liquid crystal molecules to deflect, so as to realize display.

For example, in the array substrate provided by an example of the present embodiment, the first electrode and/or the second electrode can adopt a transparent conductive material, for example, the transparent conductive material can be a transparent oxide conductive material such as indium tin oxide (ITO).

For example, in the array substrate provided by an example of the present embodiment, as illustrated in FIG.

3A, the first source electrode, the second source electrode and the data line are integrally formed, that is, the first source electrode, the second source electrode and the data line can be formed by one patterning process. Thus, the first source electrode, the second source electrode and the data line can be obtained by patterning the same conductive layer, thereby saving the mask process.

For example, in the array substrate provided by an example of the present embodiment, as illustrated in FIG. 3A, the array substrate further includes a first gate line 171 and a second gate line 172. The first thin film transistor 110 includes a first gate electrode 112, the second thin film transistor 120 includes a second gate electrode 122, the first gate electrode 112 is connected with the first gate line 171, the second gate electrode 122 is connected with the second gate line 172. Therefore, the first thin film transistor and the second thin film transistor can be respectively driven through the first gate line and the second gate line.

For example, as illustrated in FIG. 3A, the first gate electrode 112 and the first gate line 171 can be integrally formed, that is, the first gate electrode and the first gate line can be formed by one patterning process. Thus, the first gate electrode and the first gate line can be obtained by patterning the same conductive layer.

For example, as illustrated in FIG. 3A, the second gate electrode 122 and the second gate line 172 can be integrally formed, that is, the second gate electrode and the second gate line can be formed by one patterning process. Thus, the second gate electrode and the second gate line can be obtained by patterning the same conductive layer.

For example, as illustrated in FIG. 3A, the first gate line 171 is parallel to the second gate line 172.

For example, in the array substrate provided by an example of the present embodiment, as illustrated in FIG. 3A, the first thin film transistor 110 further includes a first active layer 114, the first active layer 114 is disposed between a layer of the first gate electrode 112 and a layer of the first source electrode 116 and the first drain electrode 118 (source and drain electrode layer), the second thin film transistor 120 further includes a second source layer 124, the second source layer 124 is disposed between a layer of the second gate electrode 122 and a layer of the second source electrode 126 and the second drain electrode 128 (source and drain electrode layer). Certainly, the first thin film transistor and the second thin film transistor further include other necessary layer structures, the details can refer to the existing design, and the present disclosure is not limited thereto. It should be noted that, the first thin film transistor and the second thin film transistor provided by embodiments of the present disclosure can adopt a top gate type structure or a bottom gate type structure.

For example, in the array substrate provided by an example of the present embodiment, as illustrated in FIG. 3A, the array substrate further includes a first connection electrode 181 and a second connection electrode 182. The first drain electrode 118 is connected with the first electrode 130 through the first connection electrode 181; the second drain electrode 128 is connected with the second electrode 140 through the second connection electrode 182.

For example, the first connection electrode and the first electrode can be integrally formed, that is, can be formed by one patterning process. For example, a conductive layer can be formed on a side of the first thin film transistor away from the base substrate, the conductive layer can be connected with the first drain electrode through such as a via hole, and then the conductive layer can be patterned to obtain the first connection electrode and the first electrode. Certainly, embodiments of the present disclosure include but are not limited thereto.

For example, similarly, the second connection electrode and the second electrode can be integrally formed, that is, can be formed by one patterning process.

Figure 3B:
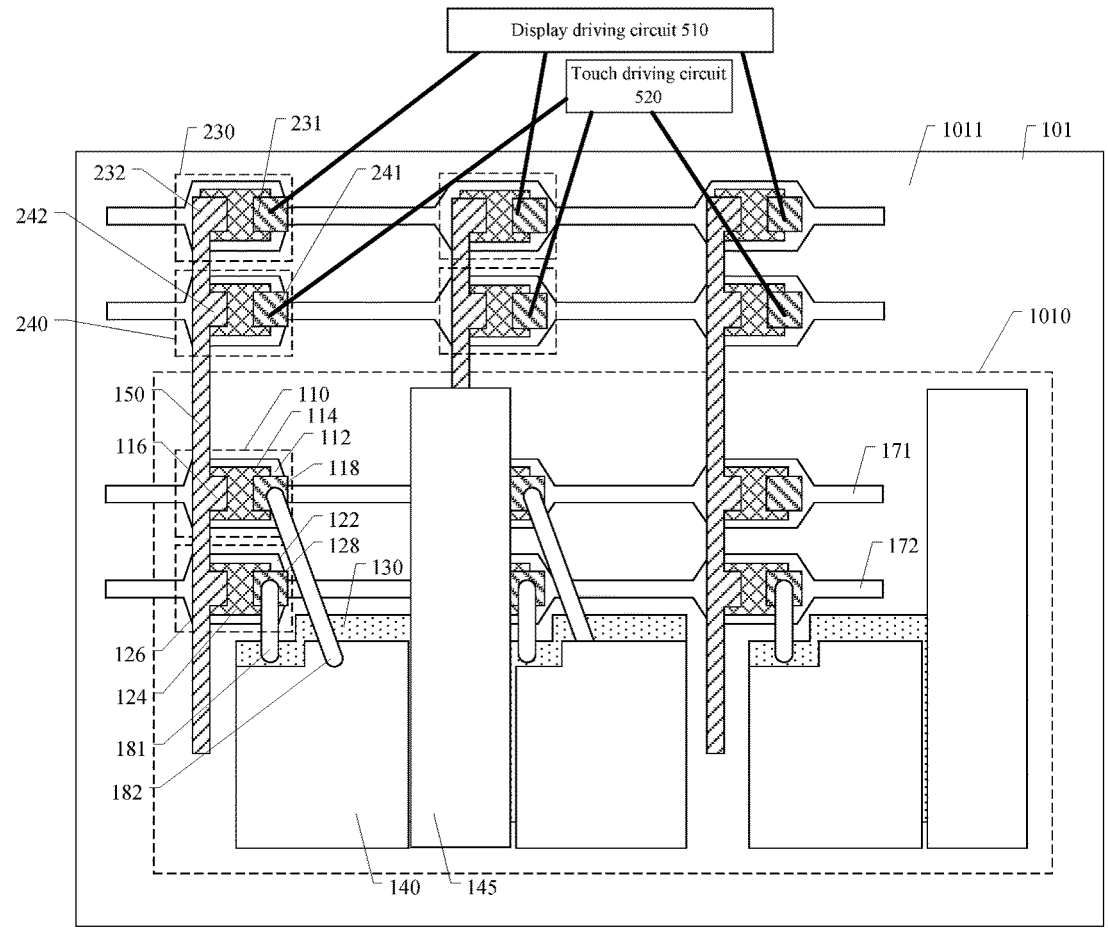
FIG. 3B is a planar view of another array substrate provided by an embodiment of the present disclosure.

FIG. 3B illustrates another array substrate according to the present embodiment. As illustrated in FIG. 3B, the array substrate further includes: a third thin film transistor 230 and a fourth thin film transistor 240 which are disposed on the base substrate 101 and located in the peripheral region 1011, the third thin film transistor 230 includes a third source electrode 231 and a third drain electrode 232, the fourth thin film transistor 240 includes a fourth source electrode 241 and a fourth drain electrode 242, the third source electrode 231 is connected with a display driving circuit 510, the fourth source electrode 241 is connected with a touch driving circuit 520, the third drain electrode 232 and the fourth drain 242 are respectively connected with the data line 150. Thus, the display driving circuit can load a signal to the data line by turning on the third thin film transistor, and turning off the fourth thin film transistor, for example, the signal can be the display data signal and the common voltage signal; the fourth thin film transistor can be turned on, and the third thin film transistor can be turned off, so that the touch driving circuit can load the touch signal to the data line.

Figure 4:
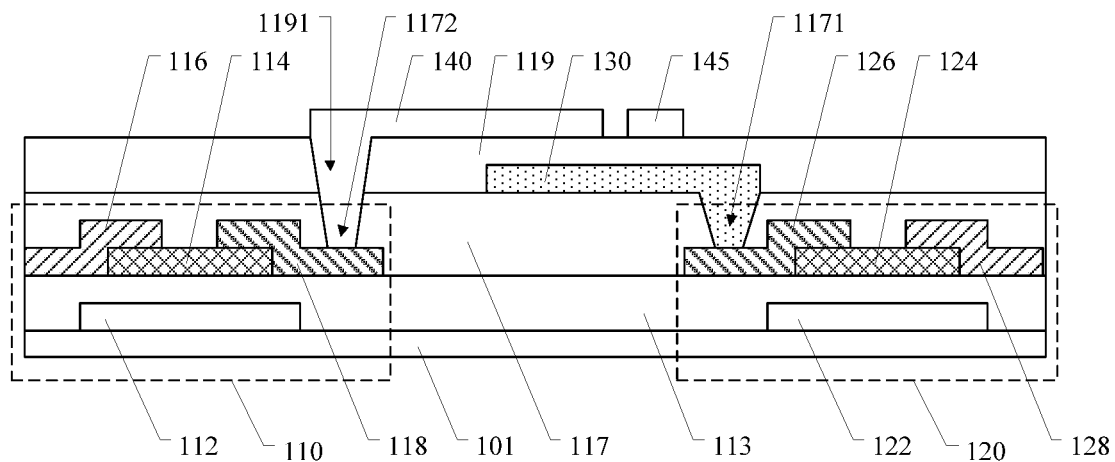
FIG. 4 is a sectional view of an array substrate in an AA' direction of FIG. 3A provided by an embodiment of the present disclosure.

FIG. 4 illustrates a sectional view of an array substrate in an AA' direction of FIG. 3A provided by an embodiment of the present disclosure. As illustrated in FIG. 4, the first thin film transistor 110 and the second thin film transistor 120 are disposed in the same layer. Thus, the first thin film transistor and the second thin film transistor can be simultaneously formed without increasing the mask process; and the thickness of the array substrate can also be reduced. It should be noted that, the same layer arrangement of the first thin film transistor and the second thin film transistor as mentioned above means that function layers (the gate electrode, the active layer and the source and drain electrode layer and so on) of the first thin film transistor and the second thin film transistor are respectively disposed in the same layer. For example, as illustrated in FIG. 4, the gate electrode 112 of the first thin film transistor 110 and the gate electrode 122 of the second thin film transistor 120 are disposed in the same layer; the active layer 114 of the first thin film transistor 110 and the active layer 124 of the second thin film transistor 120 are disposed in the same layer; the source electrode 116 and the drain electrode 118 of the first thin film transistor 110 are disposed in the same layer as the source electrode 126 and the drain electrode 128 of the second thin film transistor 120.

For example, in the array substrate provided by an example of the present embodiment, as illustrated in FIG. 4, the array substrate further includes a passivation layer 117 and an insulating layer 119. The passivation layer 117 is disposed on a side of the first thin film transistor 110 and the second thin film transistor 120 away from the base substrate 101; the insulating layer 119 is disposed between the first electrode 130 and the second electrode 140. The first electrode 130 is disposed on a side of the passivation layer 117 away from the base substrate 101, the second electrode 140 is disposed on a side of the insulating layer 119 away from the base substrate 101.

For example, in the array substrate provided by an example of the present embodiment, as illustrated in FIG. 4, the first electrode 130 is connected with the first drain electrode 118 through a first via hole 1171 in the passivation layer 117, for example, as illustrated in FIG. 4, the first electrode 130 is connected with the first drain electrode 118 through the first connection electrode 181 and the first via hole 1171; the second electrode 140 is connected with the second drain electrode 128 through a second via hole 1172 in the passivation layer 117 and a third via hole 1191 in the insulating layer 119, for example, as illustrated in FIG. 4, the second electrode 140 is connected with the second drain electrode 128 through the second connection electrode 182, the second via hole 1172 and the third via hole 1191.

Figure 5:
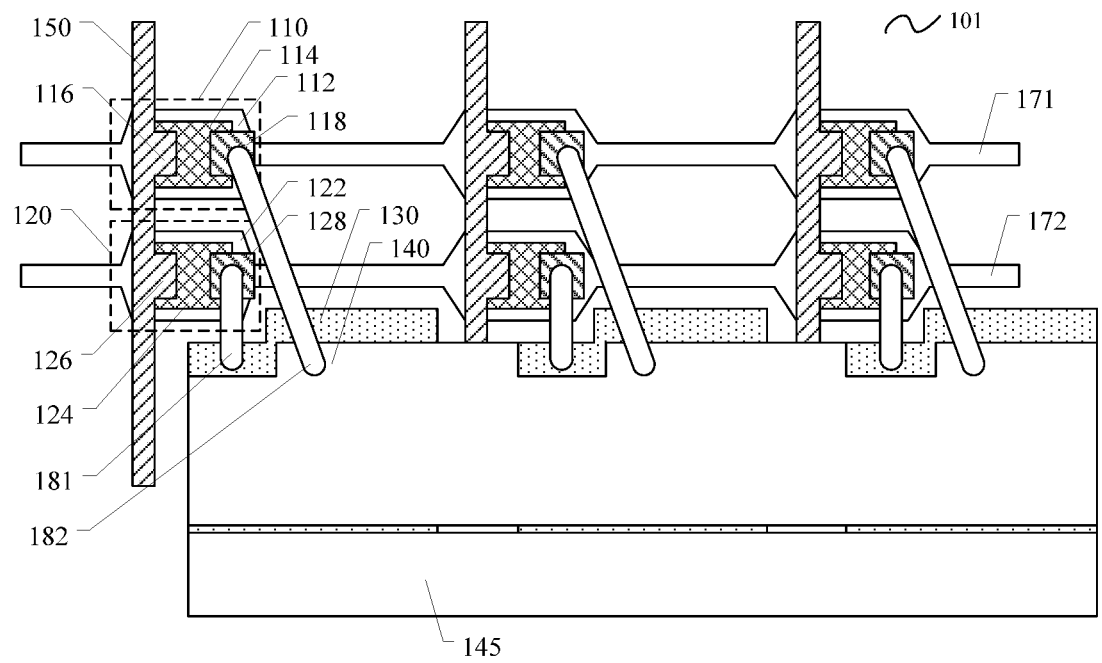
FIG. 5 is a planar view of another array substrate provided by an embodiment of the present disclosure.
Figure 6:
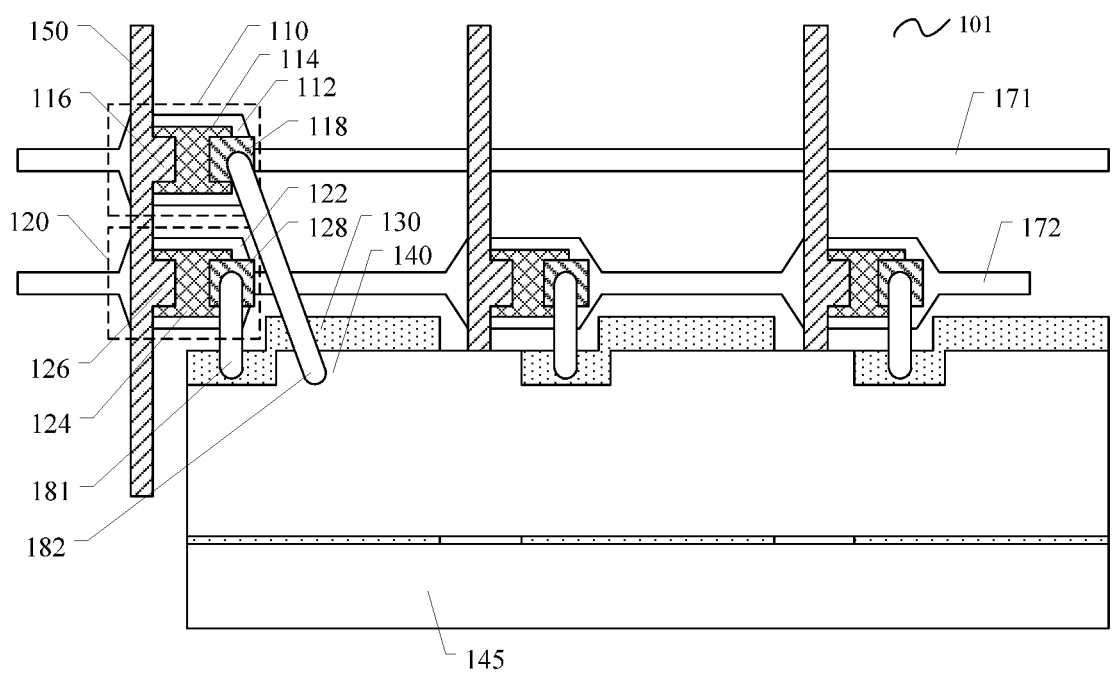
FIG. 6 is a planar view of another array substrate provided by an embodiment of the present disclosure.

Another embodiment of the present disclosure provides an array substrate. In the array substrate, a ratio of a number of the first thin film transistors 110 to a number of the second thin film transistors 120 is greater than or equal to 1:1. FIG. 5 illustrates an array substrate according to the present embodiment. As illustrated in FIG. 5, the first electrode 130 is a pixel electrode, the second electrode 140 is a common electrode, the ratio of the number of the first thin film transistors 110 to the number of the second thin film transistors 120 is 1:1. Because one common electrode can corresponding to a plurality of pixel electrodes, for example, as illustrated in FIG. 5, one second electrode 140 corresponds to three first electrodes 130, in this case, the second electrode 140 is connected with the data line 150 through three thin film transistors 120. FIG. 6 illustrates another array substrate according to the present embodiment. As illustrated in FIG. 6, the ratio of a number of the first thin film transistors 110 to a number of the second thin film transistors 120 is 3:1. Because one common electrode can be disposed corresponding to a plurality of pixel electrodes, the number of the second thin film transistors can be less than the number of the first thin film transistors. The ratio of the number of the first thin film transistors to the number of the second thin film transistors can be adjusted according to an actual condition, as long as each of the common electrodes is connected with the drain electrode of at least one second thin film transistor.

For example, in the array substrate provided by an example of the present embodiment, as illustrated in FIG. 5 and FIG. 6, the array substrate further includes a storage electrode 145 which is disposed in the same layer as the second electrode 140. An orthogonal projection of the storage electrode 145 on the base substrate 101 is at least partially overlapped with an orthogonal projection of the first electrode 130 on the base substrate 101. Thus, the storage electrode 145 and the first electrode 130 can constitute a storage capacitor to store the display data signal on the first electrode.

For example, as illustrated in FIG. 5 and FIG. 6, the storage electrode 145 can be parallel to the first gate line 171 or the second gate line 172. For example, each storage electrode can be connected with a common voltage signal. It should be noted that, upon the second electrode being used as a touch electrode, a touch electrode can be formed by combining a plurality of second electrodes. For example, the plurality of second electrodes can be combined by an algorithm of a driving circuit.

For example, in the array substrate provided by an example of the present embodiment, a number of the first electrodes (i.e., pixel electrodes) is 720*3*1080=2332800 (a number of pixels is 720*1080), a number of the first thin film transistors is also 2332800; a number of the second electrodes (common electrodes and touch electrodes) is 32*18=576. Therefore, in order to ensure that each common electrode is connected with the drain electrode of at least one second thin film transistor, the ratio of the number of the first thin film transistors to the number of the second thin film transistors is 4050:1–1:1. For example, the ratio of the number of the first thin film transistors to the number of the second thin film transistors is greater than 1:1 and less than 4050:1, so as to reduce the number of the second thin film transistors without affecting the touch accuracy.

For example, in the array substrate provided by an example of the present embodiment, a ratio of a number of the first gate lines to a number of the second gate lines is greater than or equal to 1:1. That is, the number of the first gate lines can greater than or equal to the number of the second gate lines. The common electrode can be disposed corresponding to a plurality of pixel electrodes belonging to a plurality of rows, therefore, the number of the first gate lines can greater than the number of the second gate lines.

Figure 7:
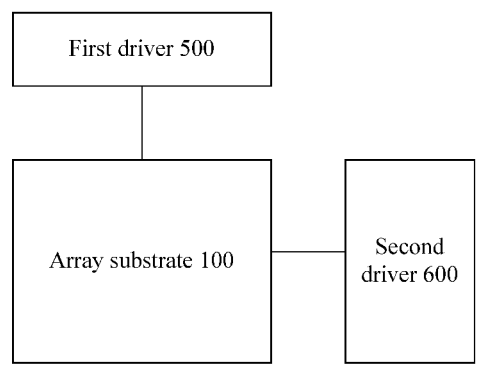
FIG. 7 is a schematic diagram of a display device provided by an embodiment of the present disclosure.

An embodiment of the present disclosure provides a display device. FIG. 7 illustrates a display device according to the present embodiment. As illustrated in FIG. 7, the display device includes the array substrate 100 according to any one of the abovementioned embodiments. Thus, the display device can load a signal on the data line to the first electrode and the second electrode in a time division manner through the first thin film transistor and the second thin film transistor, so as to simultaneously implement display function and touch function. And, the display device does not need to be additionally provided with a touch metal layer and a touch signal line, thereby reducing the number of mask processes of the array substrate, and the costs of the array substrate.

For example, in the display device provided by an example of the present embodiment, as illustrated in FIG. 7, the display device further includes a first driver 500 and a second driver 600, the first driver 500 is configured to provide a display data signal, a touch signal and a common voltage signal for the data line in a time sequence, and the second driver 600 is configured to turn on or turn off the first thin film transistor and the second thin film transistor in a time sequence. Thus, the first driver and the second driver can respectively drive the data line, the first thin film transistor and the second thin film transistor in a time division manner to realize display and touch functions For example, the first driver 500 can include the display driving circuit 510 and the touch driving circuit 520 as mentioned above.

For example, the first driver and the second driver can be integrated into one driver.

Figure 8:
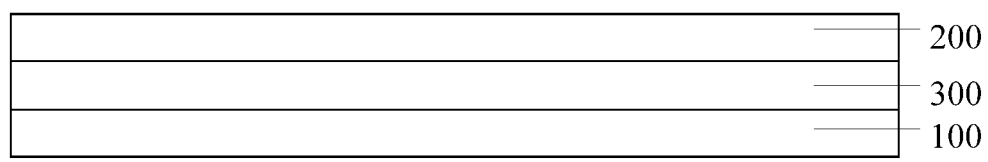
FIG. 8 is a schematic diagram of another display device provided by an embodiment of the present disclosure.

FIG. 8 illustrates a display device according to the present embodiment. As illustrated in FIG. 8, the display device further includes an opposing substrate 200 and a liquid crystal layer 300. The opposing substrate 200 is disposed opposite to the array substrate 100, the liquid crystal layer 300 is disposed between the array substrate 100 and the opposing substrate 200, upon a voltage being applied to the first electrode 130 and the second electrode 140, the first electrode 130 and the second electrode 140 can generate an electric field to drive liquid crystal molecules in the liquid crystal layer 300.

Figure 9:
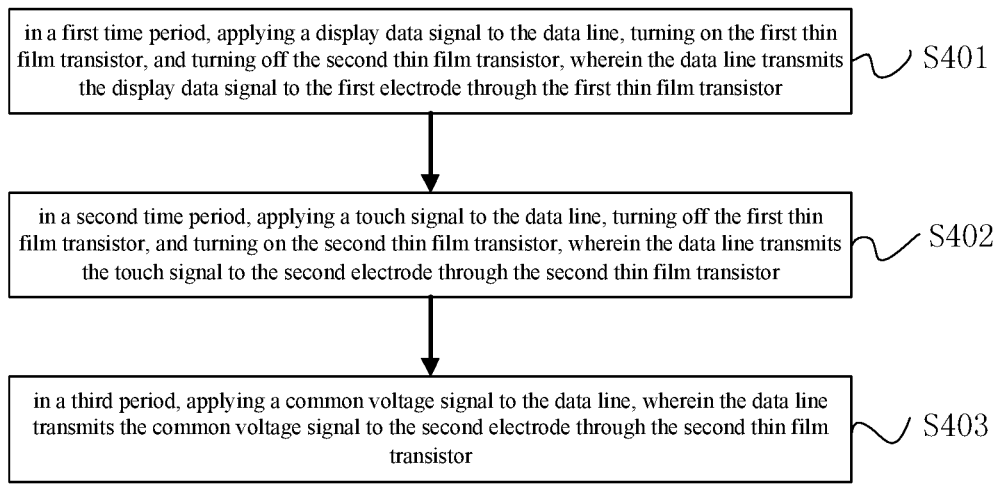
FIG. 9 is a flow chat of a driving method of a display device provided by an embodiment of the present disclosure.

An embodiment of the present disclosure provides a driving method of a display device. FIG. 9 is a flow chat of a driving method of a display device according to the present embodiment. As illustrated in FIG. 9, the driving method includes following steps S401-S403.

S401: in a first time period, applying a display data signal to the data line, turning on the first thin film transistor, and turning off the second thin film transistor, wherein the data line transmits the display data signal to the first electrode through the first thin film transistor.

S402: in a second time period, applying a touch signal to the data line, turning off the first thin film transistor, and turning on the second thin film transistor, wherein the data line transmits the touch signal to the second electrode through the second thin film transistor.

S403: in a third period, applying a common voltage signal to the data line, turning off the first thin film transistor, and turning on the second thin film transistor, wherein the data line transmits the common voltage signal to the second electrode through the second thin film transistor.

In the driving method of the display device provided by the present embodiment, a signal on the data line can be loaded to the first electrode and the second electrode in a time division manner through the first thin film transistor and the second thin film transistor, so as to simultaneously implement display function and touch function. In the first period, a display data signal is applied to the data line, the first thin film transistor is turned on and the second thin film transistor is turned off, the data line transmits the display data signal to the first electrode through the first thin film transistor, the first electrode is charged; in the second period, a touch signal is applied to the data line, the first thin film transistor is turned off and the second thin film transistor is turned on, the data line transmits the touch signal to the second electrode through the second thin film transistor, the second electrode is used as a touch electrode for performing touch; in the third period, a common voltage signal is applied to the data line, the data line transmits the common voltage signal to the second electrode through the second thin film transistor, the second electrode is charged and forms an electric field between the first electrode to drive liquid crystal molecules in the liquid crystal layer to deflect. It should be noted that, the sequence of the first period, the second period and the third period as mentioned above can be disposed according to an actual condition, embodiments of the present disclosure are not limited thereto.

The following points should to be explained:

1) The drawings of at least one embodiment of the present disclosure only relate to the structure in the embodiment of the present disclosure, and other structures may be referenced to the usual design.

2) In the absence of conflict, the features of the same embodiment and the different embodiments ban be combined with each other.

The above are only specific implementations of the present disclosure, however the scope of the present disclosure is not limited thereto, variations or substitutions that easily occur to any one skilled in the art within the technical scope disclosed in the present disclosure should be encompassed in the scope of the present disclosure. Therefore, the scope of the present disclosure should be based on the scope of the claims.

What is claimed is:

1. An array substrate, comprising:
a base substrate, comprising a display region and a peripheral region surrounding the display region; and
a first thin film transistor, a second thin film transistor, a data line, a first electrode and a second electrode, which are disposed on the base substrate and located in the display region,
wherein the first thin film transistor comprises a first source electrode and a first drain electrode, the second thin film transistor comprises a second source electrode and a second drain electrode, the first source electrode and the second source electrode are respectively connected with the data line, the first drain electrode is connected with the first electrode, the second drain electrode is connected with the second electrode, the first electrode is a pixel electrode, the second electrode is a touch electrode, and an orthographic projection of the second electrode on the base substrate is at least partially overlapped with an orthographic projection of the first electrode of the first electrode on the base substrate.

2. The array substrate according to claim 1, wherein the second electrode is also used as a common electrode.

3. The array substrate according to claim 2, wherein the first thin film transistor is provided in plural, the second thin film transistor is provided in plural, and a ratio of a number of the first thin film transistors to a number of the second thin film transistors is greater than or equal to 1:1.

4. The array substrate according to claim 1, further comprising:
a third thin film transistor and a fourth thin film transistor, which are disposed on the base substrate and located in the peripheral region,
wherein the third thin film transistor comprises a third source electrode and a third drain electrode, the fourth thin film transistor comprises a fourth source electrode and a fourth drain electrode, the third source electrode is configured to be connected with a display driving circuit, the fourth source electrode is configured to be connected with a touch driving circuit, the third drain electrode and the fourth drain are respectively connected with the data line.

5. The array substrate according to claim 1, wherein the data line is configured to load a display data signal, a touch signal, and a common voltage signal.

6. The array substrate according to claim 1, further comprising:
a storage electrode, disposed in a same layer as the second electrode,
wherein an orthogonal projection of the storage electrode on the base substrate is at least partially overlapped with an orthogonal projection of the first electrode on the base substrate.

7. The array substrate according to claim 1, wherein the first thin film transistor is disposed in a same layer as the second thin film transistor.

8. The array substrate according to claim 1, wherein the first source electrode, the second source electrode and the data line are formed by one patterning process.

9. The array substrate according to claim 1, further comprising:
a passivation layer, disposed on a side of the first thin film transistor and the second thin film transistor away from the base substrate; and
an insulating layer, disposed between the first electrode and the second electrode,
wherein the first electrode is disposed on a side of the passivation layer away from the base substrate, and the second electrode is disposed on a side of the insulating layer away from the base substrate.

10. The array substrate according to claim 8, wherein the first electrode is connected with the first drain electrode through a first via hole in the passivation layer, the second electrode is connected with the second drain electrode through a second via hole in the passivation layer and a third via hole in the insulating layer.

11. The array substrate according to claim 1, further comprising:
a first gate line; and
a second gate line,
wherein the first thin film transistor further comprises a first gate electrode, the second thin film transistor further comprises a second gate electrode, the first gate electrode is connected with the first gate line, the second gate electrode is connected with the second gate line.

12. The array substrate according to claim 11, wherein the first gate line is provided in plural, the second gate line is provided in plural, and a ratio of a number of the first gate lines to a number of the second gate lines is greater than or equal to 1:1.

13. The array substrate according to claim 11, wherein the first thin film transistor further comprises a first active layer, the first active layer is disposed between a layer of the first gate electrode and a layer of the first source electrode and the first drain electrode, the second thin film transistor further comprises a second source layer, the second source layer is disposed between a layer of the second gate electrode and a layer of the second source electrode and the second drain electrode.

14. A display device, comprising the array substrate according to claim 1.

15. The display device according to claim 14, further comprising:
- a first driver, configured to provide a display data signal, a touch signal and a common voltage signal for the data line in a time sequence; and
- a second driver, configured to turn on or off the first thin film transistor and the second thin film transistor in a time sequence.

16. A driving method of the display device according to claim 14, comprising:

in a first period, applying a display data signal to the data line, turning on the first thin film transistor, and turning off the second thin film transistor, wherein the data line transmits the display data signal to the first electrode through the first thin film transistor;

in a second period, applying a touch signal to the data line, turning off the first thin film transistor, and turning on the second thin film transistor, wherein the data line transmits the touch signal to the second electrode through the second thin film transistor; and in a third period, applying a common voltage signal to the data line, turning off the first thin film transistor, and turning on the second thin film transistor, wherein the data line transmits the common voltage signal to the second electrode through the second thin film transistor.

17. The array substrate according to claim 3, wherein the data line is configured to load a display data signal, a touch signal, and a common voltage signal.

18. The array substrate according to claim 3, further comprising:
- a storage electrode, disposed in a same layer as the second electrode,
- wherein an orthogonal projection of the storage electrode on the base substrate is at least partially overlapped with an orthogonal projection of the first electrode on the base substrate.

* * * * *